United States Patent [19]
Baumann

[11] Patent Number: 5,288,056
[45] Date of Patent: Feb. 22, 1994

[54] ECCENTRICALLY DISPLACEABLE SLEEVE TYPE SHUT-OFF VALVE

[76] Inventor: Hans D. Baumann, 32 Pine St., Rye, N.H. 03870

[21] Appl. No.: 45,651

[22] Filed: Apr. 9, 1993

[51] Int. Cl.$^5$ .......................................... F16K 31/528
[52] U.S. Cl. ...................................... 251/251; 251/229
[58] Field of Search ............... 251/251, 252, 258, 262, 251/331, 229

[56] References Cited

U.S. PATENT DOCUMENTS

| | | | |
|---|---|---|---|
| 824,527 | 6/1906 | Colina | 251/251 |
| 2,534,577 | 12/1950 | Courtot | 251/258 X |
| 2,812,154 | 11/1957 | Norstrand | 251/251 |
| 3,395,888 | 8/1968 | Neto | 251/331 X |
| 3,603,349 | 9/1971 | Botnick | 251/229 X |
| 4,014,514 | 3/1977 | Priese et al. | 251/331 |
| 4,293,117 | 10/1981 | Mueller | 251/229 |

FOREIGN PATENT DOCUMENTS 3142062 5/1983 Fed. Rep. of Germany ...... 251/251

Primary Examiner—Stephen M. Hepperle

[57] ABSTRACT

The Eccentrically displaceable sleeve type shut-off valve is comprised of a housing having a central, vertical bore retaining therein a flexible, tubular sleeve whose central portion can be eccentrically motivated towards or away from a valve seat and which is located perpendicularly towards and at the center of said vertical bore, by a core element positioned inside said sleeve and which is capable of being radially displaced by a cam type mechanism following the reciprocal movements of a valve stem.

4 Claims, 1 Drawing Sheet

ECCENTRICALLY DISPLACEABLE SLEEVE TYPE SHUT-OFF VALVE

BACKGROUND OF THE INVENTION

This invention relates to packless shut-off valves used to block the flow of fluid in a piping conduit. A typical example of a packless valve used for this purpose is a diaphragm valve as illustrated, for example, in U.S. Pat. No. 4,014,514. These valves provide good closure means and are reasonably compact. However, since the diaphragm acts both as a closure member and a stem seal, these diaphragms have to be fairly large and are typically two to three times the diameter of the valve orifice. The result is a requirement for substantial actuating forces to overcome the forces created by the diaphragm area times fluid pressure. In case the diaphragm is made out of a plastic, such as PTFE (Polytetrafluoroethylene), routine repeated closure of such a diaphragm is not guaranteed due to the high mechanical stress imposed upon by the large flexible movement required for such a diaphragm. Another disadvantage of a diaphragm valve is their highly streamlined flow passage which can lead to cavitation and wear under high fluid velocities. Finally, the body size of a typical diaphragm valve is fairly large in comparison to the port opening which makes the construction of such a valve fairly expensive.

My invention overcomes these and other objections to valves of prior art by using a flexible tube as a closure element and stem sealing device. The flexible tube itself can be made from any commercial elastomeric or plastic, such as PTFE (Polytetrafluoroethylene) without imposing undue stresses on the material. The relatively small amount of radial displacement of the sealing material requires only moderate actuating forces which leads to substantial cost savings as far as actuating devices are concerned. In comparison to diaphragm valves, which have relatively large areas subject to fluid pressure and, therefore, high stresses, my flexible tube is supported over more than 90% of the exposed area by an interiorly placed mechanical element resulting again in relatively low stress levels, thereby guaranteeing a substantially higher number of life cycles. Another advantage lies in the fact that my sealing tube diameter is only about 65% larger than the valve port diameter, therefore, requiring a relatively small valve housing and valve closure flanges. Finally, my invention provides for a valve that can be utilized in full vacuum without fear of the sealing membrane collapsing under a negative pressure gradient as is the case with typical diaphragm valves. These and other important advantages will be explained more clearly by the following drawings and descriptions.

DESCRIPTION OF THE INVENTION

While the invention will be described in connection with a preferred embodiment, it should be understood that there is no intention to limit the invention to this specific embodiment.

Figure 1:
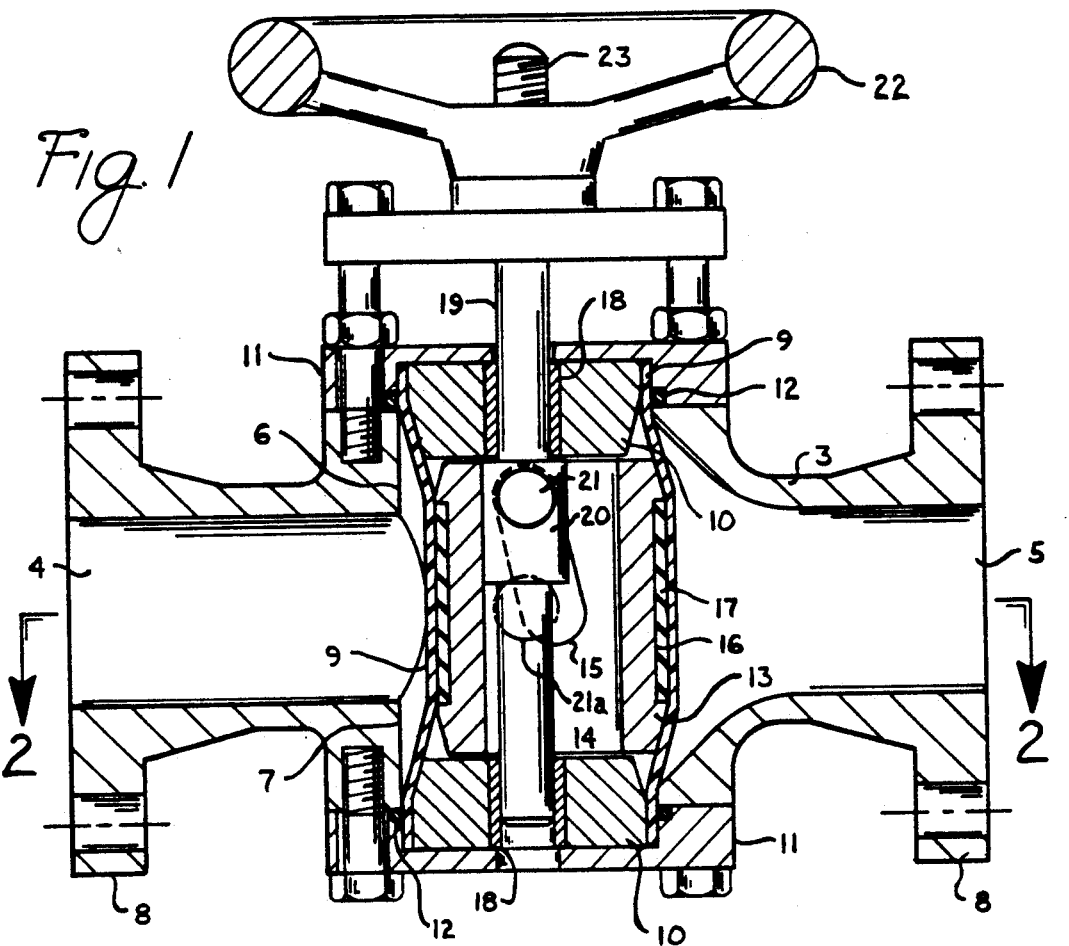
FIG. 1 is a vertical central, cross-sectional view of a preferred embodiment of my invention, where the valve is shown in the open position.

Referring to FIG. 1, my invention is comprised of the valve housing 3 having an inlet port 4 and an outlet port 5. It should be understood that in order to function properly, inlet ports 4 and 5 could easily be reversed and that the choice of location is purely one out of convenience. Valve housing 3 has a central, circular, perpendicular bore 6 and where the intersection between inlet port 4 and circular bore 6 provides for a cylindrical sealing surface 7 constituting a valve seat. Inlet port 4 and outlet port 5 have a flanged structure 8 suitable to connect to a fluid containing piping system. Circular bore 6 contains within a flexible tube or sleeve 9 which fits snugly into circular bore 6 and which is supported in the inside by an insert 10, the latter being held in place by an upper and lower bonnet flange 11. Suitable o-ring seals 12 prevent fluid from leaking past the sleeve and bonnet flange 11. The central interior of sleeve 9 is occupied by a barrel-shaped element 13 having a hollowed center portion 14. A part of the wall of the barrel-shaped element 13 is slotted on two sides 15. This slotted portion has a tapered longitudinal extension. A portion of the outer circumference of the barrel-shaped element 13 has a recessed diameter 16 in which a relatively soft elastic material 17 is placed or glued to provide a soft support for the central portion of the flexible sleeve 9. Insert 10, furthermore, has a guide bushing 18 guiding therein a valve stem 19 which has a thickened central portion 20 to which are fastened a pair of journal pins 21 configured to engage slidingly within the tapered grooves 15. The upper extension of stem 19 engages a handwheel 22 through a threaded portion 23.

Figure 2:
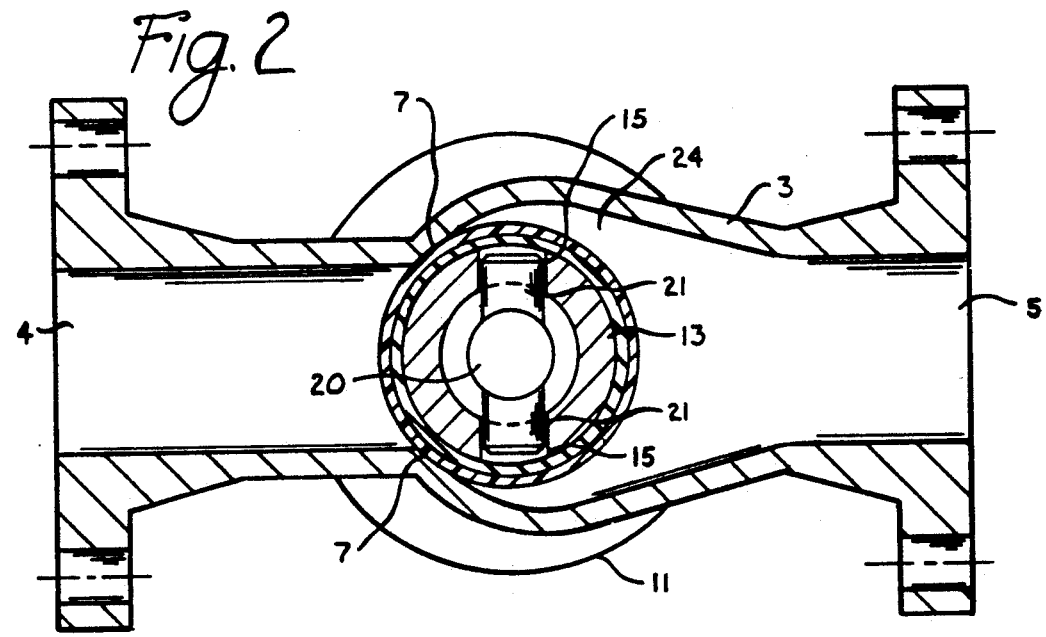
FIG. 2 is a horizontal, cross-sectional view of the device shown in FIG. 1 and following the line 2—2 in FIG. 1, and where the valve is shown in the closed position.

Referring specifically to FIG. 1, here we see journal pins 21 (as part of stem 19) in the raised position, that is, in the upper portion of tapered slot 15, thereby forcing the barrel-shaped element 13 towards outlet port 5. This in turn will lead to an eccentric, radial displacement of the flexible sleeve 9 away from sealing surface 7, which will allow fluid in inlet port 4 to flow between sealing surface 7 and flexible tube 9 into body cavity 24 and from there to outlet port 5. This is the open valve position. Upon actuation of the handwheel, valve stem 19 is forced down, which in turn forces barrel-shaped element 13 to move towards the inlet port 4 and ultimately forcing flexible sleeve 9 to engage sealing surface 7 of housing 3 to accomplish a disruption of fluid flow from inlet port 4. This will happen when journal pin 21 is in the dashed position identified as 21A. This is also the position illustrated in FIG. 2. Since the flexible sleeve 9 may be made out of a corrosion resistant inert material such as PTFE (Polytetrafluoroethylene), which is a relatively hard material, a bubble tight contact to sealing surface 7 may not be possible especially since there may be additional mechanical misalignments present due to the effects of various machining tolerances. To overcome this problem, I have devised for an elastomeric support by adding an additional sleeve 17 between barrel-shaped element 13 and the flexible sleeve 9. This sleeve 17 is made from a relatively elastic material and, therefore, will compensate for any dimensional imperfections as described previously.

Numerous modifications can be made to the invention without departing from the spirit of the following claims; for example, journal pins 21 might have additional bearing means to reduce sliding friction; the tapered slots 15 can be made curved to provide additional force amplification; central portion 20 can be made in the form of a wedge cooperating with a similar wedge located in bore 14 of barrel-shaped element 13; and sealing surface 7 can be machined slightly eccentrically offset from the center of bore 6 to reduce the amount of eccentric excursion of flexible sleeve 9, and so on.

Having thus described a typical embodiment, I hereby claim the following features of my invention:

1. Eccentrically displaceable sleeve type shut-off valve, comprising a housing having at least one horizontal inlet port and outlet port and one central opening extending essentially perpendicular to said inlet port, the interface between said horizontal inlet port and the perpendicular central opening constituting a valve seat, a flexible sleeve inserted within and extending beyond the length of said central opening, a cylindrical core snugly fitting within said flexible sleeve and extending in width beyond the cross-sectional dimension of said inlet port, a shaft extending through the length of said central opening and having a camming element, said core having a bore cooperatively engaging with the shaft and having suitably configured portions to engage said camming element of the shaft and capable of causing the lateral displacement of said core toward said inlet port thereby forcing the central portion of said flexible sleeve to make a complimentary motion and thereby causing the sleeve to contact the valve seat to close off and prevent fluid from flowing from the inlet to the outlet port upon sufficient longitudinal displacement of said shaft, suitable closure means attached to either terminating end of said central opening to retain a portion of the flexible sleeve.

2. Eccentrically displaceable sleeve type shut-off valve of claim 1, wherein said camming element of the shaft is comprised of a thickened central portion of said shaft having two journal pins extending perpendicularly there from, and where the cylindrical core has a pair of slots penetrating the walls of said core on opposed sides and where said slots have a longitudinal axis that is more than 5 degrees offset from the vertical axis of said core, and where each of the journal pins cooperatively engages one of the slots in order to accomplish said lateral displacement.

3. Eccentrically displaceable sleeve type shut-off valve of claim 1, wherein said core has a recess within its outer circumferential periphery and where a suitable elastomeric insert is fastened within said recess in order to provide cushioning support for that portion of the flexible sleeve which can be in contact with the valve seat.

4. Eccentrically displaceable sleeve type shut-off valve of claim 1, wherein each of said closure means is comprised of a flange suitably attached to said valve housing and having a circular opening to snugly engage the upper or lower extremity of the flexible sleeve, and further having additional tapered inserts which snugly engage the inside of said flexible sleeve, and suitable seals mounted within said flange and configured to prevent fluid flow from said central opening past the exterior of said flexible sleeve and between the housing and said flange.

* * * * *